United States Patent
Simpkin et al.

(10) Patent No.: US 11,035,292 B2
(45) Date of Patent: *Jun. 15, 2021

(54) HIGH EFFICIENCY POWER GENERATION SYSTEM AND SYSTEM UPGRADES

(71) Applicant: Hi Eff Utility Rescue LLC, Dallas, TX (US)

(72) Inventors: William Edward Simpkin, Dallas, TX (US); Donald R. Wilson, Arlington, TX (US)

(73) Assignee: Hi Eff Utility Rescue LLC, Dallas, TX (US)

(*) Notice: Subject to any disclaimer, the term of this patent is extended or adjusted under 35 U.S.C. 154(b) by 68 days.

This patent is subject to a terminal disclaimer.

(21) Appl. No.: 16/384,463

(22) Filed: Apr. 15, 2019

(65) Prior Publication Data
US 2020/0109662 A1 Apr. 9, 2020

Related U.S. Application Data

(63) Continuation of application No. 15/225,571, filed on Aug. 1, 2016, now Pat. No. 10,260,415, which is a
(Continued)

(51) Int. Cl.
*F02C 1/05* (2006.01)
*G21D 5/06* (2006.01)
(Continued)

(52) U.S. Cl.
CPC ............ *F02C 1/05* (2013.01); *F01K 3/181* (2013.01); *F01K 23/02* (2013.01); *F02C 1/06* (2013.01);
(Continued)

(58) Field of Classification Search
CPC .......... F01K 23/02; F01K 3/181; F01D 15/10; F02C 1/05; F02C 1/06; F02C 1/08; F02C 7/00; F22B 1/1823; Y02E 20/16
See application file for complete search history.

(56) References Cited

U.S. PATENT DOCUMENTS 3,043,763 A 9/1959 Spillmann
3,466,871 A 9/1969 Osborn, Jr. et al.
(Continued)

FOREIGN PATENT DOCUMENTS

CN 104662262 A 5/2015
DE 102010033659 A1 2/2012
(Continued)

OTHER PUBLICATIONS

Tilliette, Z.P.; "A Contribution to the H.T.G.R. Energy Conversion Issue", XP 000308715, IECEC-91, Aug. 4-9, 1991, 7 pages.
(Continued)

*Primary Examiner* — Steven M Sutherland
(74) *Attorney, Agent, or Firm* — Boisbrun Hofman, PLLC

(57) ABSTRACT

A power generation system includes an inert gas power source, a thermal/electrical power converter and a power plant. The thermal/electrical power converter includes a compressor with an output coupled to an input of the inert gas power source. The power plant has an input coupled in series with an output of the thermal/electrical power converter. The thermal/electrical power converter and the power plant are configured to serially convert thermal power produced at an output of the inert gas power source into electricity. The thermal/electrical power converter includes an inert gas reservoir tank coupled to an input of the compressor via a reservoir tank control valve and to the output of the compressor via another reservoir tank control valve. The reservoir tank control valve and the another reservoir tank control valve are configured to regulate a temperature of the output of the thermal/electrical power converter.

20 Claims, 8 Drawing Sheets

Related U.S. Application Data continuation-in-part of application No. 14/742,760, filed on Jun. 18, 2015, now Pat. No. 9,404,394, which is a continuation of application No. 14/451,863, filed on Aug. 5, 2014, now Pat. No. 9,068,468, which is a continuation of application No. 13/971,273, filed on Aug. 20, 2013, now Pat. No. 8,826,639.

(60) Provisional application No. 61/691,955, filed on Aug. 22, 2012.

(51) Int. Cl.
| | | |
|---|---|---|
| *F01K 23/02* | (2006.01) | |
| *F01K 3/18* | (2006.01) | |
| *F02C 1/06* | (2006.01) | |
| *F02C 1/08* | (2006.01) | |
| *G21D 5/08* | (2006.01) | |

(52) U.S. Cl.
CPC ............ *F02C 1/08* (2013.01); *G21D 5/06* (2013.01); *G21D 5/08* (2013.01); *Y02E 20/16* (2013.01)

(56) References Cited

U.S. PATENT DOCUMENTS

| | | |
|---|---|---|
| 4,000,617 A | 1/1977 | Fortescue |
| 4,702,081 A | 10/1987 | Vinko |
| 5,431,016 A | 6/1995 | Simpkin |
| 5,896,895 A | 4/1999 | Simpkim |
| 7,447,291 B2 | 11/2008 | Emin |
| 8,826,639 B2 | 9/2014 | Simpkin |
| 9,068,468 B2 | 6/2015 | Simpkin |
| 9,404,394 B2 | 8/2016 | Simpkin |
| 2014/0053560 A1 | 2/2014 | Simpkin |
| 2014/0338335 A1 | 11/2014 | Simpkin |
| 2015/0275697 A1 | 10/2015 | Simpkin |
| 2016/0341120 A1 | 11/2016 | Simpkin |

FOREIGN PATENT DOCUMENTS

| | | |
|---|---|---|
| WO | 2011059563 A2 | 5/2011 |
| WO | 2014031629 A2 | 2/2014 |

OTHER PUBLICATIONS

PCT/US2013/055774 Search Report dated Jan. 15, 2015; 12 pages.

HIGH EFFICIENCY POWER GENERATION SYSTEM AND SYSTEM UPGRADES

This application is a continuation of U.S. patent application Ser. No. 15/225,571, entitled "High Efficiency Power Generation System and System Upgrades," filed Aug. 1, 2016, which is a continuation-in-part of U.S. patent application Ser. No. 14/742,760, entitled "High Efficiency Power Generation System and System Upgrades," filed Jun. 18, 2015, now U.S. Pat. No. 9,404,394, issued Aug. 2, 2016, which is a continuation of U.S. patent application Ser. No. 14/451,863, entitled "High Efficiency Power Generation System and System Upgrades", now U.S. Pat. No. 9,068,468, issued Jun. 30, 2015, which is a continuation of U.S. patent application Ser. No. 13/971,273, entitled "High Efficiency Power Generation System and System Upgrades," now U.S. Pat. No. 8,826,639, issued Sep. 9, 2014, which claims the benefit of U.S. Provisional Patent Application Ser. No. 61/691,955, entitled "HiEff Mod." filed on Aug. 22, 2012, which applications are incorporated herein by reference.

TECHNICAL FIELD

The present invention is directed, in general, to power generation systems and, more specifically, to a system and method for employing a Brayton closed-cycle power generator to produce electricity and provide a thermal source for a thermally driven load.

BACKGROUND

Burning coal to produce electrical power is one of the critical $21^{st}$ century power generation dilemmas. Fifty-five percent of global power comes from burning coal. The resulting flue gas emissions from burning coal contain a broad spectrum of intractable climate-change and health-compromising compounds. For instance, carbon dioxide, a climate changing gas, is virtually impossible to economically eliminate in power-generating facilities. The use of natural gas instead of coal reduces, but does not eliminate the carbon dioxide. Both coal and natural gas also discharge ozone-producing gasses and soot particulates, which are costly to extract from exhaust and flue gas.

Natural gas infrastructure for domestic space and water heating is fully developed as a preferred fuel source. It is advantageous for ground transportation and as feedstock for a broad range of chemical processing. The available natural gas stores, however, are much more limited than coal. The use of natural gas for electrical power generation appears to be misguided in the long term.

To provide a perspective, the Tennessee Valley Authority ("TVA") Kingston Fossil Plant, burns about 14,000 tons of coal a day, but produces over 50,000 tons of carbon dioxide per day. Their discharge of ozone and particulate emissions is not stated. This plant powers 700,000 homes, but requires daily delivery of 140 freight-car loads of coal that must be dug out of the ground and transported to Kingston. Coal extraction, cross country delivery, on site handling and burning can be directly related to human costs, and can be directly related to mounting environmental degradation for just this one plant.

About twenty percent of world power is produced from water-cooled nuclear fission with varying degrees of public acceptance, from passive but reluctant acceptance to hysterical fear and absolute demands for nuclear power elimination. Existing nuclear power plants provide inherent risks, but are engineered and operated to exceptional safety standards. Nuclear power plants were originally designed for a 20-year life. An increasing number of nuclear plants are approaching an age of 60 years. Ten- and 20-year operating license extensions have been repeatedly granted after comprehensive examinations and analysis. Satisfying solutions to plant aging are elusive.

Population growth, rising standards of living and economic growth are putting worldwide electrical grid generating capacity margins at risk. Conservation and alternative generating sources are helpful, but are not expected to meet the growing demand. In addition, electrical demand growth to power the growing worldwide demand for air conditioning and the anticipated demand for electric cars are projected to further over stress the capacity of existing grids. Clearly, there is a growing demand for more electrical power, but current methods of power generation are problematic and unsustainable.

In 1824, Sadi Carnot described the ultimate heat engine efficiency limit of a perfect engine dependent on the highest heat-input temperature and the lowest waste-heat rejection temperature. Rankine, Diesel, Otto and Brayton conceived basic power-generation engine cycles and others have refined these basic engines. The Atkinson cycle is a recent improvement of the Otto and Diesel cycles. General Electric ("GE") and Siemens have developed open gas turbine/steam combined-cycle power plants. Each has made unique contributions to power production technology.

Steam-based Rankine cycle engines dominate electric power generation. A Rankine-cycle engine has two possible energy sources, burning coal or other fossil fuels, and nuclear fission. In both, superheated steam at high pressure drives a turbine that in turn drives an electrical alternator. A steady, continuous, recirculating flow of water and steam flows through a boiler, turbine, condenser and water pump in this closed system. The heat source is external combustion of coal, sub-grade hydrocarbons or natural gas, or from a boiling-water nuclear reactor. Waste heat is rejected from the turbine exhaust at or near ambient dew-point temperatures in a steam-condensing heat exchanger. This low temperature waste heat rejection temperature is key to normal cycle efficiencies in the 35 percent ("%") to 40% range. However, the continuous, superheated, steam turbine inlet temperature is limited to about 1000 degrees ("°") Fahrenheit ("F") to avoid hydrogen embrittlement of the turbine blades. This material limitation precludes higher efficiencies from operating at higher superheated steam temperatures. This superheated steam temperature limit exists for both combustion and nuclear heat sources.

Coal-fired units produce electricity by burning coal in a boiler to heat water to produce steam, generally employing a coal/fossil fueled, closed Rankine cycle (steam) power plant. Steam, at tremendous pressure, flows into a turbine, which spins a generator to produce electricity. The steam is cooled, condensed back into water, and the water is pumped back to the boiler to continue the process.

For example, the coal-fired boilers at TVA's Kingston Fossil Plant near Knoxville, Tenn., heat water to about 1000° F. (540° Celsius ("C")) to create steam. The steam is piped to turbines at pressures of more than 1,800 pounds per square inch (130 kilograms per square centimeter). The turbines are connected to the generators and spin them at 3600 revolutions per minute to make alternating current electricity at, e.g., 20,000 volts. River water is pumped through tubes in a condenser to cool and condense the steam discharging from the turbines. The Kingston plant generates about 10 billion kilowatt-hours a year, or enough electricity to supply 700,000 homes. As mentioned previously hereinabove, to meet this demand Kingston burns about 14,000 tons of coal day, an amount that would fill 140 railroad cars daily.

The open Brayton cycle is generally used in gas turbine and combined-cycle power plants that burn liquid or gaseous fossil fuels, and produce refractory environmental stressors. The turbine blades and other structures formed of superalloy materials to limit oxidation and creep temperature properties, however, limit turbine operating temperatures to about 2000° to 2100° F. Complex internal turbine blade cooling systems enable turbine inlet gas temperatures to exceed 2500° F., but these high temperatures produce a full range of harmful ozone activators and high levels of nitrous and nitric oxides ("NOx"). Typical turbine exhaust temperatures of 500° to 700° F. compromise efficiency to mid-40 percent range. In conventional fossil-fueled power plants, whether designed for steam or gas turbines, the combustion products are ozone-producing gases, carbon dioxide, and particulate soot that are environmental stressors. These toxic exhaust products cannot be easily eliminated, and are costly to reduce. Climate stability-challenging carbon dioxide removal from coal fired boilers is not practical at this time.

In nuclear powered power-generating plants, high-pressure steam is produced by contact cooling of water with fission-reacting fuel rods. In the heating process, the circulating water and steam become radioactive. This large mass of radioactively contaminated water is an unavoidable and an unfortunate side effect in all existing nuclear power plants. Consequently, all existing nuclear plants must absolutely prevent water and steam venting or leakage. They must also be actively controlled in all operating modes to prevent "melt down" and accompanying water dissociation, hydrogen explosions, and uncontrolled spread of radioactive gases, liquids, and particles. Prevention of these types of failures is a high tribute to comprehensive and exhaustive excellence in engineering, manufacturing, and vigilant operation in a safety culture.

Notwithstanding these precautions, three reactor meltdowns have happened in the past half century including Three Mile Island without injuries. Another incident occurred at Chernobyl with 31 on-site deaths and long-term evacuation of a 1000 square mile region, plus undisclosed, high human and animal sickness and early deaths. In 2011, multiple melt downs at the Japanese Fukushima power plants followed a tsunami with monumental tragedies.

Limitations of conventional power generation approaches have now become substantial hindrances for wide-scale power generation with high efficiency and low levels of undesirable environmental pollutants. No satisfactory strategy has emerged to provide a sustainable, long-term solution for these issues. Accordingly, what is needed in the art is a new approach that overcomes the deficiencies in the current solutions.

SUMMARY OF THE INVENTION

These and other problems are generally solved or circumvented, and technical advantages are generally achieved, by advantageous embodiments of the present invention, in which a power generation system includes an inert gas power source, a thermal/electrical power converter and a power plant. The inert gas power source is formed with an input and an output. The thermal/electrical power converter includes a compressor with an output coupled to the input of the inert gas power source. The power plant has an input coupled in series with an output of the thermal/electrical power converter. The thermal/electrical power converter and the power plant are configured to serially convert thermal power produced at the output of the inert gas power source into electricity. The thermal/electrical power converter includes an inert gas reservoir tank coupled to an input of the compressor via a reservoir tank control valve and to the output of the compressor via another reservoir tank control valve. The reservoir tank control valve and the another reservoir tank control valve are configured to regulate a temperature and/or pressure of the output of the thermal/electrical power converter.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

Figure 1:
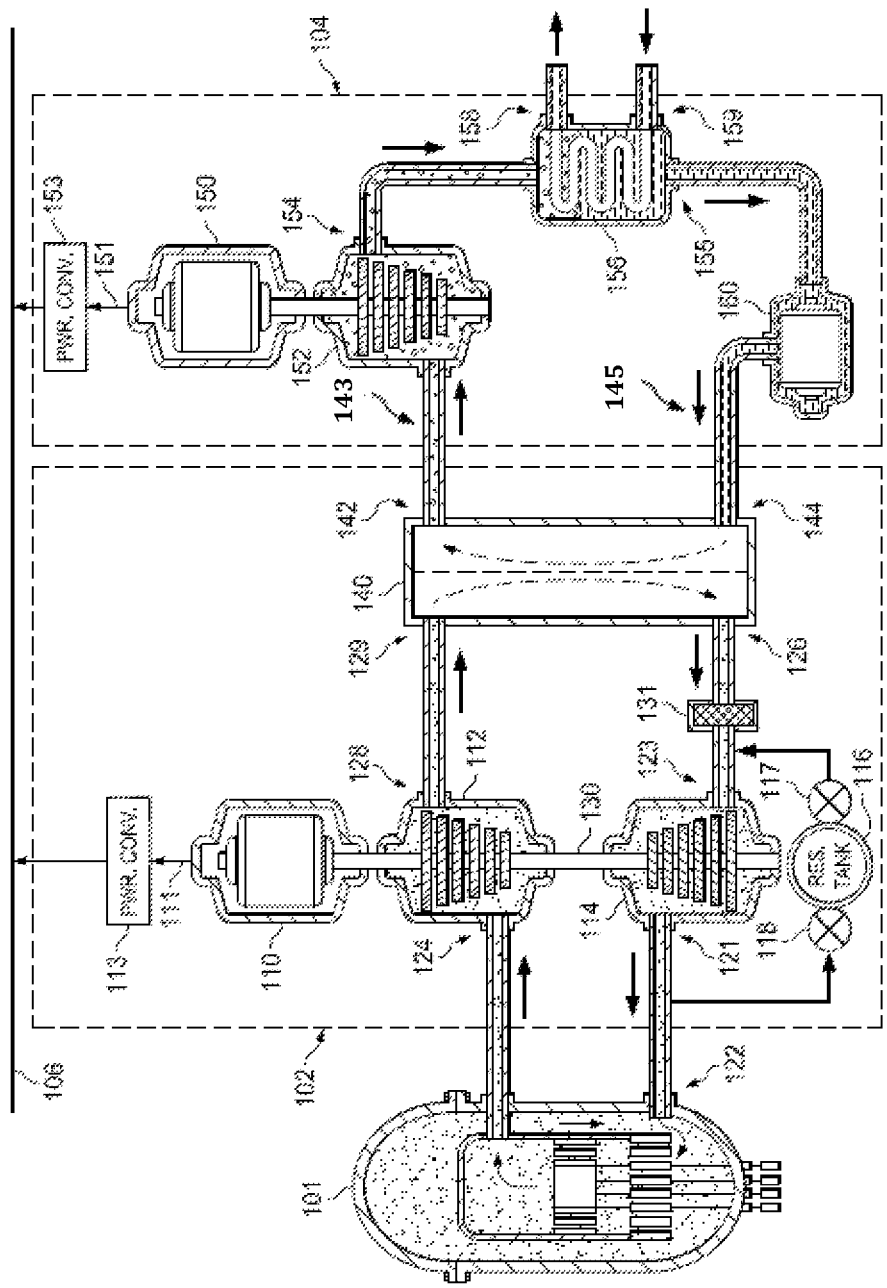
FIGS. 1 and 2 illustrate diagrams of embodiments of power generation systems.

The making and usage of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems and modules associated with a process for producing a thermal power source.

Combined gas/steam cycle power generation employing open Brayton-closed Rankine combined cycles includes both fuel-burning gas turbine and fuel-burning steam turbine generators. Hot turbine exhaust energy is recovered in a boiler to partially generate steam and superheated steam of a steam power plant. A combined-cycle power generation arrangement, however, requires a full complement of complex and costly components and controls, with full facility costs of both a high performance gas turbine and a complete steam power plant. There remains a complex and broad range of ultra-high temperature combustion and environmental stressors that offset or diminish some of the value of combined-cycle power generation arrangements.

U.S. Pat. No. 5,431,016, entitled "A High Efficiency Power Generation," to W. E. Simpkin, issued Jul. 11, 1995, (hereinafter "Simpkin 1"), which is incorporated herein by reference, describes a power generating system formed with a light gas reactor powered by a closed Brayton cycle that discharges waste heat to supply energy for a steam-based Rankine cycle. The physical application is directed to specifying carbon-carbon materials in all ultra-high temperature locations. Simpkin 1 employs an ultra-high temperature light gas to benefit from energy efficiency advantages of the two cycles while reducing limitations of each. Simpkin 1 is an advance using Carnot's principles to produce higher efficiency power generation. A holistic approach is described that enhances overall, compound-cycle efficiency.

Simpkin 1 also includes design concepts for piping and pressure vessels containing very high temperatures within a conventional steel structure. A portion of Simpkin 1 was issued later as U.S. Pat. No. 5,896,895, entitled "Radiation Convection Conduction Heat Flow Insulation Barriers," to W. E. Simpkin, issued Apr. 27, 1999, (hereinafter "Simpkin 2"), which is incorporated herein by reference. The original insulation concept is retained in the "High Efficiency Power Generation" descriptions disclosed in Simpkin 1.

Light gas (e.g., helium, "He") reactors are generally referred to as Generation IV Emerging Nuclear Power Reactors, which have a long Research and Development ("R&D") history motivated by inherent safety aspects. Helium is a unique, totally stable gas at all pressures and temperatures encountered in the reactor designs. Helium does not become radioactive, even in high intensity radiation or at very high temperatures. It does not change state and is absolutely inert. Helium does not interact chemically with organic or inorganic atoms or molecules. Its inertness is absolute even to surface effects. Helium does not ionize at temperatures encountered in reactor-cooling applications and does not change its atomic structure.

Advanced nuclear technology is globally coordinated by the Generation IV International Forum. Two of the six Generation IV nuclear reactor development programs are helium cooled. The Very High Temperature Reactor ("VHTR") is a thermal reactor in full scale prototype build in 2013, and the Gas Cooled Fast Neutron Breeder Reactor ("GFR") now undergoing component testing and development is seven to ten years later for deployment than the VHTR. These two helium-cooled reactors are significantly different in their neutron action processes and life cycles. As producers of very high temperature helium flows, they are quite similar. Applications using the VHTR and the GFR are described herein as functionally interchangeable for providing a thermal source of very high temperature helium.

The GFR has been projected to beneficially reduce the difficult and costly nuclear waste storage problem. Existing nuclear waste could provide a very low cost fuel supply for decades, if not centuries, in GFR power production. The GFR is a fast neutron breeder reactor that extracts nearly all of the potentially fissionable material, leaving low-level residual radiation waste. Fourth Generation nuclear power plants include helium-cooled (light gas) reactors because they are inherently safer and environmentally benign. A thermal-version VHTR and a GFR provide probable further growth potential beyond today's high performance for both reactors.

The VHTR is a graphite-moderated, helium-cooled reactor with a thermal neutron spectrum. The VHTR is designed to be a high-efficiency system, which can supply electricity and process heat to a broad spectrum of high-temperature and energy-intensive processes. A U.S. Department of Energy ("DOE") reference reactor formed with a 600 megawatt thermal ("MWth") core connected to an intermediate heat exchanger can deliver process heat, e.g., up to 900° C. (1652° F.). The reactor core can be a prismatic block core or a pebble-bed core according to a structure of the fuel particles. Fuel particles are coated with successive material layers that are high-temperature resistant, and are then formed either into fuel compacts or rods that are embedded into hexagonal graphite blocks for a prismatic block-type core reactor, or are formed into graphite coated pebbles for a pebble-bed core. The reactor produces heat with core outlet helium temperatures up to about 1000° C. The closed helium circuit can enable non-power producing applications such as hydrogen production or process heat for the petrochemical industry. Thermal processes requiring lower temperature than that supplied by a reactor supply could be configured to supply an application-specific compressor-turbine-generator set providing an application-specified turbine discharge temperature. As an application of a nuclear heat-generating process, hydrogen can be efficiently produced from only heat and water by using a thermochemical iodine-sulfur process, or a high temperature electrolysis process, with additional natural gas, by applying a steam-reformer technology. A prototype VHTR is being fabricated in 2013 for demonstration trials in the mid-2010s, and component and sub-system testing have demonstrated inherent safety characteristics of a GFR.

Thus, a VHTR offers a thermal source for high-efficiency electricity production and a broad range of process heat applications while retaining desirable safety characteristics in normal as well as off-normal events. The basic technology for the VHTR has been well established in former high temperature gas reactor plants such as the United States Fort Saint Vrain and Peach Bottom prototypes, and the German AVR and THTR prototypes. The technology is being advanced through near- or medium-term projects lead by several plant vendors and national laboratories, such as PBMR, GTHTR300C, ANTARES, NHDD, GT-MHR, and NGNP in South Africa, Japan, France, Republic of Korea, and the United States. Experimental reactors such as the HTTR in Japan (30 MWth) and the HTR-10 in China (10 MWth) support advanced concept development, as well as cogeneration of electricity and nuclear heat production applications.

The GFR system employs a fast-neutron spectrum, helium-cooled reactor and a closed fuel cycle. The DOE Generation IV GFR demonstration project uses a direct-cycle helium turbine for electricity generation, or can optionally use its process heat for production of hydrogen. Through the combination of a fast neutron spectrum and full recycling of actinides, the GFR reduces the production of long-lived radioactive waste. The fast neutron spectrum of the GFR also makes it possible to use available fissile and fertile materials (including depleted uranium) much more efficiently than thermal spectrum gas reactors that employ once-through fuel cycles. Several fuel forms are candidates that hold the potential for operating at very high temperatures and ensure excellent retention of fission products. The fuel forms include composite ceramic fuel, advanced fuel particles, or ceramic-clad elements of actinide compounds. Core configurations can be based on pin- or plate-based assemblies or on prismatic blocks. A DOE Generation IV GFR reference cites an integrated on-site "nuclear waste" refabrication plant GFR fuel supply. Through the combination of a fast neutron spectrum and full recycling of actinides, the GFR develops very low-cost power and reduces the production of long-lived radioactive waste.

As introduced herein, a compound electrical power generator is formed having two interdependent closed-cycle turbine-driven alternators. A closed-cycle Brayton inert (e.g., helium) gas turbine/alternator power generation system is coupled to and supplies superheated steam to a closed-cycle Rankine steam turbine/generator. An overhauled candidate, a retired or new Rankine steam turbine/generator, is employed for the Rankine power-generation process. The Rankine steam turbine/generator receives steam at controlled quantities, pressure, and temperature from energy extracted from heat exchangers from high temperature, helium turbine outflow gas produced by the Brayton power generation system. A Brayton-cycle gas turbine is powered by an inert light gas reactor (e.g., a VHTR or GFR). The steam temperature supplied to the Rankine steam turbine/generator system is set and controlled to an application-dependent temperature level sufficient to power the Rankine steam turbine/generator load.

The turbine employed in the Brayton power generation system has a low, tailored pressure ratio, and a low-cost compressor and gas turbine. Thus, the Brayton power generation system produces power and provides superheated steam according to specification for integration into an existing steam turbine generator to form a compound power plant. In an embodiment, the Brayton power generation system provides power for a thermally driven chemical or refining process such as hydrogen production or petroleum refining. Such chemical or refining process can be endothermic or exothermic.

The power-generation architectures introduced herein come at a time in technology development in which safety, health, and environmental factors are of greater consequence than achieving record system efficiencies. Profound advances in health and safety, and elimination of environmental stressors can be achieved with described modifications of an existing utility power plant. In addition, the modifications introduced herein can readily increase existing plant capacities by 40% or more, with potential for further capacity growth.

The power generation modifications are equally suitable for either fossil-fuel fired or nuclear power plants. The heat source system and boiler of an existing fossil-fueled or nuclear power plant would be removed. The remainder of the plant, steam turbine, alternator, condenser, pumps, and electrical- and control-system elements continue in use as before.

Additional large economic savings come from using the same site, the same electrical distribution system, the same support and physical infrastructure, and unchanged cooling water supply and steam condenser systems. As introduced herein, modifications of a steam generator provide a large increase in compound plant capacity and efficiency. Refabricated "nuclear waste" can provide an abundant supply of low-cost fuel for the GFR. These economic leverages provide incentives for implementing a high efficiency modification of a moth-balled plant or in lieu of a necessary major overhaul.

A modified power plant can provide substantial financial benefits to a utility. Valuable assets can be reclaimed, including the site, rotating systems, cooling condensing system, electrical infrastructure/grid connections, and functional elements of the business infrastructure. Thus, a substantial plant capacity increase can be obtained that uses abundant, low-cost fuel, thereby providing a safer and cleaner power-generation solution than previously employed.

Turning now to FIG. 1, illustrated is a diagram of an embodiment of a power generation system. The power generation system includes two, interdependent, closed-loop thermal/electrical power systems with a Brayton closed-loop power generation and processing system, and a Rankine closed-loop power processing system. The elements illustrated in FIG. 1 are not drawn to scale.

A thermal/electrical power converter 102 is formed with a generator (such as an alternator) 110, a gas turbine 112, and a compressor 114, all mechanically coupled via a rotatable shaft 130. An electrical power output 111 of the generator 110 may be coupled through switchgear and an optional power converter 113 to a power grid 106, such as an alternating current ("ac") or a direct current ("dc") power grid. The generator 110 is an electro-mechanical device that can produce either an ac output or a dc output according to its design. The term "alternator" will be used herein to refer to an electro-mechanical device that can produce an ac output. The switchgear and an optional power converter 113 may include an ac transformer and an inverter.

In an embodiment, the optional power converter 113 can be employed to convert a dc output of the generator 110 to ac at a frequency suitable for connection to the power grid 106. In an embodiment, the optional power converter 113 can be employed to convert an ac output of the generator 110 at one frequency to another frequency suitable for connection to the power grid 106. An optional gear box may be coupled between the gas turbine 112 and the generator 110 to provide a different rotation rate of the generator 110 relative to that of the gas turbine 112.

An input 124 of the gas turbine 112 is coupled to a high-temperature, high-pressure, inert gas thermal power source (referred to as an "inert gas power source" or "inert gas thermal power source") 101, such as a VHTR or GFR helium-cooled, light gas reactor. An example high-temperature, high-pressure helium cooled gas power source is illustrated and described hereinbelow with reference to FIG. 4. Other inert gases such as, without limitation, argon, xenon, and neon, are contemplated within the broad scope of the present invention as a heat-transfer/working fluid medium for an inert gas power source. Also, other power sources such as a source of combusted fossil fuel (see, e.g., U.S. Pat. No. 5,431,016, previously incorporated by reference) can also be used for the power generation system. A low-pressure output 128 of the gas turbine 112 is coupled to a high-temperature input 129 of a heat exchanger 140. A low-pressure output 126 of the heat exchanger 140 is coupled to a low-pressure input 123 of the compressor 114. A high-pressure output 121 of the compressor 114 is coupled to an input of the inert gas power source 101 via return line 122.

An inert gas reactor such as a VHTR or a GFR can introduce dust particles into the inert gas flow, particularly with a pebble-bed reactor. Over time, dust particles can erode gas turbine and compressor blades, and even inert gas piping at piping bends. To remove such dust particles from the inert gas flow, a filter 131 can be installed between the low-pressure output 126 of the heat exchanger 140 and the low-pressure input 123 of the compressor 114, which is a low temperature position to install a filter 131. In an embodiment, such filter 131 can have a minimum equivalent reporting value ("MERV") of 7.

The thermal/electrical power converter 102 is assumed herein to be operable between its input and a combined output that includes the electrical power output 111 of the generator 110 and a thermal output between a high-temperature steam output 142 and a low-temperature, liquid-water input 144 of the heat exchanger 140 with very highly efficient power conversion. This assumes that the generator 110 is operable with substantially 100% power conversion efficiency. A practical generator operable to convert mechanical shaft power to an electrical output in a high-power plant can generally achieve a power conversion efficiency in the mid- to high-90% range, and the slightly imperfect power conversion efficiency of such a high-power generator is ignored herein. Such mechanical-to-electrical power conversion plants are not limited by a second-law efficiency constraint imposed by a Carnot cycle.

The high-temperature steam output 142 of the heat exchanger 140 is coupled to an input 143 of a thermally driven Rankine-cycle power plant (also referred to as a "power plant") 104. In an embodiment, the thermal energy produced at the high-temperature steam output 142 of the heat exchanger 140 provides the power input to the power plant 104, which can be an existing, modified steam-driven plant. A high-pressure, cooled-water output 145 of the power plant 104 is coupled to the low-temperature, liquid-water input 144 of the heat exchanger 140. Thus, substantially the entire thermal output of thermal/electrical power converter 102 is supplied to the power plant 104, with exception of the small inefficiency of the generator 110. No substantial thermal sink need be coupled to the thermal/electrical power converter 102 with exception of modest cooling for the generator 110.

Pipeline pressure losses are included in calculating heat exchanger pressure drops for convenience in calculating system performance evaluations. A small pressure drop at the input side of the heat exchanger 140 does not contribute to system inefficiency. The small pressure drop of the heat exchanger 140 is simply accommodated by operating pressure differences between the compressor 114 and the gas turbine 112. Thermal content of heated water or other heated fluid that may be employed to cool the generator 110 (or other system elements) may be employed to preheat the low pressure, cooled helium at the high-temperature steam output 142 of the heat exchanger 140 before being supplied to the compressor 114 to provide a further efficiency enhancement to the thermal/electrical power converter 102.

The power plant 104 is operable in a conventional way. High-pressure, high-temperature steam from the high-temperature steam output 142 of the heat exchanger 140 is coupled to a high-pressure, high-temperature input of a gas turbine 152 of the power plant 104. A generator 150 of the power plant 104 is mechanically coupled to a rotatable shaft of the gas turbine 152, and an electrical power output 151 of the generator 150 may be coupled to the power grid 106 through a switchgear and an optional power converter 153 that may be similar in function to the switchgear and optional power converter 113 described previously hereinabove. The power grid to which the generator 150 is coupled can be the same or different power grid to which the generator 110 of the thermal/electrical power converter 102 is coupled.

A low-pressure, steam output 154 of the gas turbine 152 is coupled to an input of a heat exchanger/condenser 156 of the power plant 104. A low-temperature output 155 of the heat exchanger/condenser 156 conducting low-pressure, cooled water is coupled to a low-pressure input of a water pump 160 of the power plant 104. A high-pressure water output of the water pump 160 is coupled to the low-temperature, liquid-water input 144 of the heat exchanger 140. A high-temperature water output 158 of the heat exchanger/condenser 156 is coupled to a low-temperature thermal sink such as cooling water supplied from a river. A low-temperature (e.g., 40 to 80° F.) liquid-water input 159 of the heat exchanger/condenser 156 is coupled to the low-temperature thermal sink. The heat exchanger/condenser 156 can be an unchanged steam condenser for waste heat rejection to a cooling water subsystem in a thermally-driven process.

In a manner similar to that described hereinabove for the helium filter 131 installed after the low-pressure output 126 of the heat exchanger 140, a water filter can be introduced into the cold water return between the heat exchanger/condenser 156 and the heat exchanger 140 to remove suspended particles.

The overall power-conversion efficiency of the power generation system illustrated in FIG. 1 is the summed electrical outputs of the generators 110, 150 divided by the thermal input measured between the input 124 of the gas turbine 112 and the high-pressure output 121 of the compressor 114 (to the inert gas power source 101), and can be of the order of 45 to 50% or more in a practical plant. The overall thermal efficiency of a typical nuclear-, natural gas-, oil-, or coal-fueled power plant is typically in the mid-thirties percent, and is limited by the Carnot efficiency of practical Rankine cycle gas turbine/compressor power converters. Overall efficiency of a front-end thermal/electrical power converter 102 as introduced herein is not so limited.

In an example embodiment, the inert gas power source 101 provides an inert gas thermal source at a temperature of about 1650° F. with an energy flow of about 1100 MWth to the input 124 of the gas turbine 112. It is contemplated that the inert gas power source 101 can produce an inert gas at a temperature as high as 2500° F. or more (1650° F. in an example), and that left-over thermal energy at a lower temperature produced by the inert gas power source 101 can be fully utilized to power a thermally driven, closed-loop, Rankine cycle steam power system or other thermally powered process such as, for example, a chemical reactor that produces gaseous hydrogen. The shaft output power in this example of the gas turbine 112 is about 230 thermal megawatts ("MWth"), which is assumed for this example to be converted with 100% efficiency to about 230 electrical megawatts ("MWe"). The heat exchanger 140 produces about 870 MWth, which is the difference between the 1100 MWth produced by the inert gas power source 101 and the 230 MWe produced by the generator 110.

It is also contemplated that efficient gas turbine-compressor-generator sets will rotate at controlled rotational speeds of 20,000 revolutions per minute or more. It is further contemplated that gas turbine blades formed of carbon-carbon composite materials or superalloys such as Hastelloy, Inconel, Waspaloy, and Rene alloys will be able to sustain such rotational speeds at temperatures as high as 2800° F. Nonetheless, a practical highly efficient thermal/electrical power converter plant can be formed with lower rotational speeds and lower operating temperatures.

The low-pressure output 128 of the gas turbine 112 is regulated to a temperature of about 960° F. by controlling the amount of inert gas in the inert gas power source 101 with a first reservoir tank control valve 117 and a second reservoir tank control valve 118, each reservoir tank control valve coupled to and in series with an inert gas (e.g., helium)

reservoir tank (also referred to as a "reservoir tank") 116. The reservoir tank 116 provides a thermal sizing function for matching the helium mass flow in the thermal/electrical power converter 102 to the thermal power requirement of the thermally driven process load coupled thereto, which can be an existing, functioning system that was previously powered by a carbon combustion-based or a nuclear power-based power source. The reservoir tank 116 is coupled to the low-pressure input 123 of the compressor 114 via the first reservoir tank control valve 117 and the high-pressure output 121 of the compressor 114 via the second reservoir tank control valve 118 and is configured to regulate a power output and/or a temperature of the inert gas power source 101 and/or the thermal/electrical power converter 102.

As an example, if a 900 MWe steam plant is supported by three manifolded thermal/electrical power converters 102, the helium supply for each provided by the reservoir tank 116 would be "vernier" trimmed employing respective first and second reservoir tank control valves 117, 118 for substantially perfect load sharing while providing a specified temperature at the output 128 of the gas turbine 112. In a variable turbine speed plant that provides a dc output, the first and second reservoir tank control valves 117, 118 could be employed to vary the temperature or the output power at the output 128 of the gas turbine 112. In a system employing a fixed rotation rate for the gas turbine 112, the first and second reservoir tank control valves 117, 118 could be employed for load following. This is unique because all system temperatures would be fixed and part load efficiency would be a substantially invariant over a range of the electrical load coupled to the system.

In an embodiment, the gas turbine 112 is operated at substantially a constant speed of rotation so that the generator 110 coupled to the rotatable shaft 130 of the gas turbine 112 can produce an ac output at a substantially fixed frequency (e.g., 60 Hertz ("Hz")). A temperature of the low-pressure cooled helium coupled to the low-pressure input 123 of the compressor 114 is about 100° F. The first reservoir tank control valve 117 is coupled to the low-pressure output 126 of the heat exchanger 140. The second reservoir tank control valve 118 is coupled to the return line 122 from the high-pressure output 121 of the compressor 114. Pressure of the helium gas in the reservoir tank 116 is intermediate between the helium pressure at the low-pressure input 123 to the compressor 114 and the helium pressure at the high-pressure output 121 of the compressor 114. By opening the first reservoir tank control valve 117, helium from reservoir tank 116 flows into the closed-cycle helium loop that supplies the inert gas power source 101, thereby increasing the overall helium pressure in the closed-cycle helium loop. By opening the second reservoir tank control valve 118, helium is returned to the reservoir tank 116 from the return line 122, thereby decreasing the overall helium pressure in the closed-cycle helium loop. In this manner, temperature of helium output flow from the inert gas power source 101 is controlled.

In an example system, the high-pressure, high-temperature steam produced at the high-temperature steam output 142 of the heat exchanger 140 is about 900° F. The high-pressure steam supplied to the input of the gas turbine 152 is reduced by the gas turbine 152 to low-pressure steam at a temperature of about 80 to 100° F. at the low-pressure, steam output 154 of the gas turbine 152. The generator 150 is mechanically coupled to the rotatable shaft of the gas turbine 152 and produces 300 MWe. The remaining thermal output is transferred to the thermal sink (i.e., cooling water supplied from a river or other substantial body of water). The low-pressure steam at the low-pressure, steam output 154 of the gas turbine 152 is condensed to low-pressure water of about the same temperature in the heat exchanger/condenser 156. The water pump 160 repressurizes the water at its output at substantially the same temperature.

The overall compound system efficiency of the power generation system performed by the thermal/electrical power converter 102 illustrated in FIG. 1 is about 230 MWe (produced by the generator 110) plus 300 MWe (produced by the generator 150) divided by 1100 MWth (produced thermally by the inert gas power source 101), which is about 45 to 50%, almost double that of a conventional fuel-burning or nuclear-powered power plant.

Figure 2:
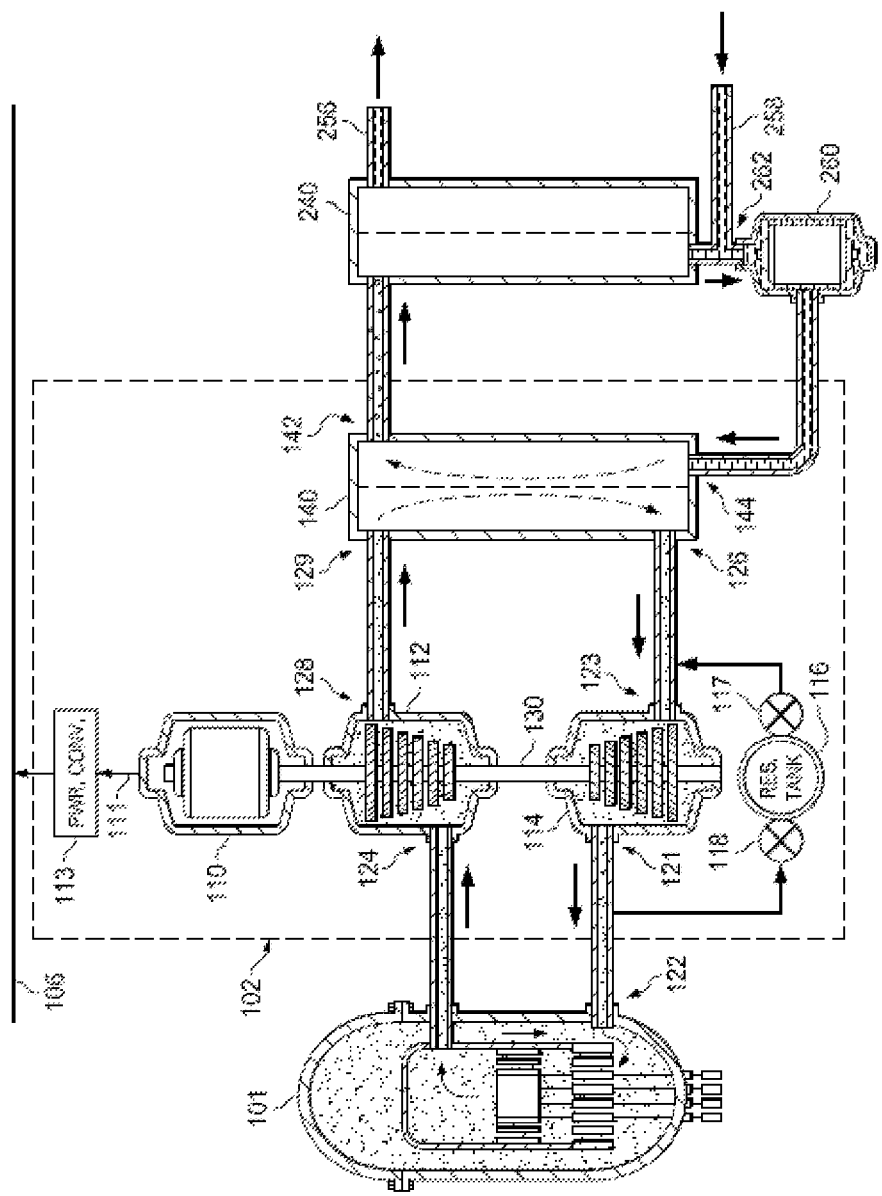

Turning now to FIG. 2, illustrated is a diagram of an embodiment of a power generation system. The power generation system is formed with a closed-loop thermal/electrical power system with a Brayton closed-loop power generator. The elements illustrated in FIG. 2 are not drawn to scale.

Analogous to the power generation system of FIG. 1, the power generation system includes the thermal/electrical power converter 102 formed with the generator 110, the gas turbine 112, and the compressor 114, all mechanically coupled via a rotatable shaft 130. The electrical power output 111 of the generator 110 is coupled through switchgear and the optional power converter 113 to the ac power grid 106. Descriptions of remaining elements of the thermal/electrical power converter 102 that are similar to those describe hereinabove with reference to FIG. 1 will not be repeated in the interest of brevity.

The high-temperature steam output 142 of heat exchanger 140 is coupled to a high-temperature thermal input of an endothermic process load (also referred to as a "thermally driven process load") 240, such as a chemical processing or refining process. In an embodiment, a low-temperature, liquid-water input 144 of heat exchanger 140 is coupled to a cooling water source 258 such as a river or a screen that may provide cooling water at a temperature in the range of 40° F. to 80° F. In an embodiment, the low-temperature, liquid-water input 144 of the heat exchanger 140 is coupled to a low-temperature water output of the thermally driven process load 240. In either case, the low-temperature, liquid-water input 144 can be circulated by a liquid-water pump 260.

The endothermic process load 240 is thus substantially wholly powered by the power generation system, with exception of the relatively quite small power required by the liquid-water pump 260 (or, similarly, by liquid-water pump 160 illustrated in FIG. 1).

The endothermic process load 240, which can be, without limitation, a chemical or refining endothermic system, can, in an embodiment, be functionally incorporated into the process represented by the heat exchanger 140. In such an arrangement, the endothermic process load 240 can directly use as a thermal source the high-temperature steam (or other working fluid) provided by the process represented by the heat exchanger 140. The output 142 and the input 144 of the heat exchanger 140 could carry a process fluid. In an embodiment, waste heat of the endothermic process load 240 can be directly discharged to a thermal sink, such as a river, or to the atmosphere, with or without a further heat exchanger.

The thermally driven process load 240 will generally produce high-temperature steam that can be cooled and condensed in a heat exchanger (e.g., the heat exchanger/condenser 156 illustrated and described hereinabove with reference to FIG. 1). Alternatively, according to the needs of the thermally driven process load 240, the high-temperature steam can be discharged to the atmosphere. Thus, the thermal/electrical power converter 102 can be employed to provide high-temperature steam or other working fluid to a thermally driven process load 240, and at the same time, produce locally generated electricity, all in an environmentally sensitive and safe manner.

A power output of (or a temperature in) the power generation system illustrated in FIG. 2 can be regulated in a manner analogous to that described previously hereinabove for the power generation system of FIG. 1 via reservoir tank control valves coupled respectively between an inert gas reservoir tank and an input and an output of the compressor 114.

Figure 3:
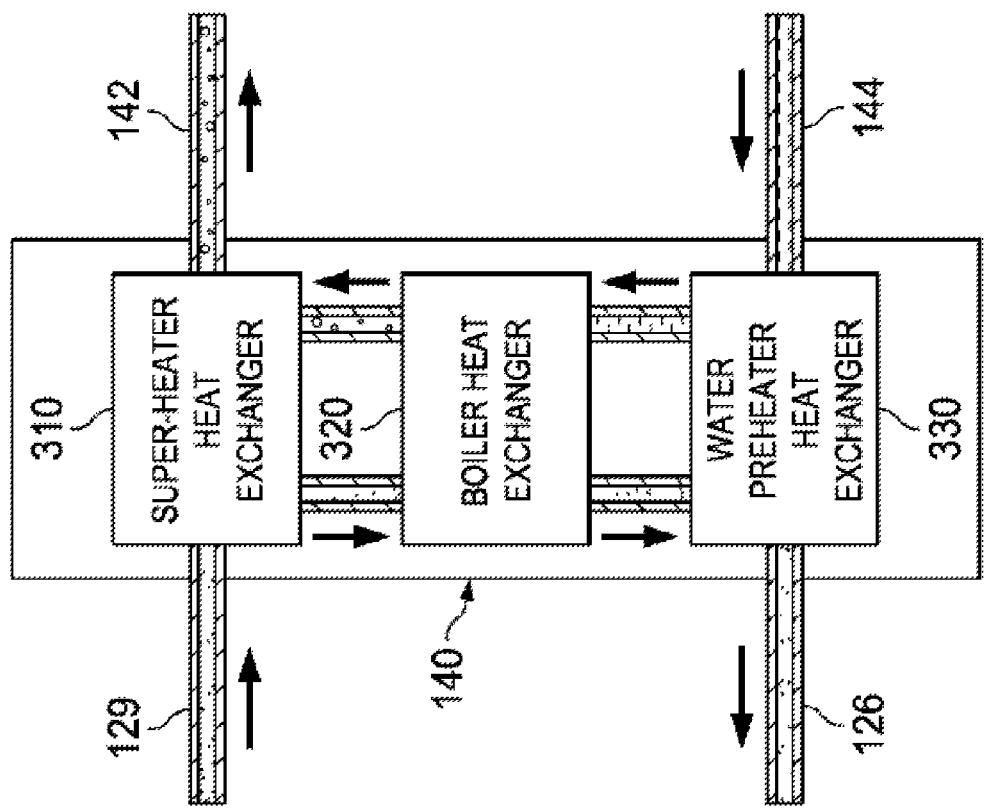
FIG. 3 illustrates a diagram of an embodiment of a heat exchanger of a power generation system.

Turning now to FIG. 3, illustrated is a diagram of an embodiment of a heat exchanger 140 of a power generation system. The heat exchanger 140 is formed with a super-heater heat exchanger 310, a boiler heat exchanger 320, and a water preheater heat exchanger 330 coupled in series. The super heater heat exchanger 310 is coupled to a high-temperature input 129 and a high-temperature steam output 142 of the heat exchanger 140. The super-heater heat exchanger 310 is configured to extract thermal energy from the high-temperature inert gas presented at the high-temperature input 129 to super-heated steam at the high-temperature steam output 142. An example temperature of the inert gas presented at the high-temperature input 129 is 960° F. In an embodiment, the inert gas is helium. The temperature of the super-heated steam produced at the high-temperature steam output 142 is 900° F. or higher, depending on the efficiency of the super-heater heat exchanger 310. The super-heater heat exchanger 310 is thus a gas-to-gas heat exchanger.

A high-temperature, inert gas input of the boiler heat exchanger 320 is coupled to a reduced temperature, inert gas output of the super-heater heat exchanger 310. A high-temperature steam output of the boiler heat exchanger 320 is coupled to a steam input of the super-heater heat exchanger 310. An example temperature of fluids at these inputs and outputs is about 650° F. The boiler heat exchanger 320 is thus a gas-to-boiling liquid heat exchanger.

A further-reduced temperature, inert gas input of the pre-heater heat exchanger 330 is coupled to a low-temperature inert gas output of the boiler heat exchanger 320. A high-temperature water output of the pre-heater heat exchanger 330 is coupled to a hot-water input of the boiler heat exchanger 320. An example temperature of fluids at these inputs and outputs is about 600 to 650° F. A low-temperature, liquid-water input 144 of the heat exchanger 140 is coupled to a low-temperature input of the pre-heater heat exchanger 330, and a low-pressure, low temperature inert gas output of the pre-heater heat exchanger 330 is coupled to a low-pressure output 126 of the heat exchanger 140. An example temperature of fluids at these inputs and outputs is about 80 to 100° F. The pre-heater exchanger 330 is thus a gas-to-liquid heat exchanger.

By constructing the heat exchanger 140 with three heat exchangers forming three heat-exchanger stages as described previously hereinabove, high overall heat-exchanger efficiency can be achieved. A practical pressure drop of the inert gas helium of about 4% can be achieved in each of these heat-exchanger stages. The overall pressure drop through the heat exchanger assembly would thus be about $(1-0.04)^3$, which is about 11-12%. The pressure drop of the inert gas flowing through the inert gas power source 101 (see FIG. 1) could be about 5%. The total pressure drop of the three heat-exchanger stages and the inert gas power source 101 (about 16%) is made up by a difference in pressure produced by compressor 114 and that absorbed by gas turbine 112 (again, see FIG. 1). There is no net loss of energy, because the respective inefficiencies due to these pressure drops produce heat that it is ultimately absorbed by the thermally driven process load coupled to the high-temperature steam output 142 of the heat exchanger 140.

Figure 4:
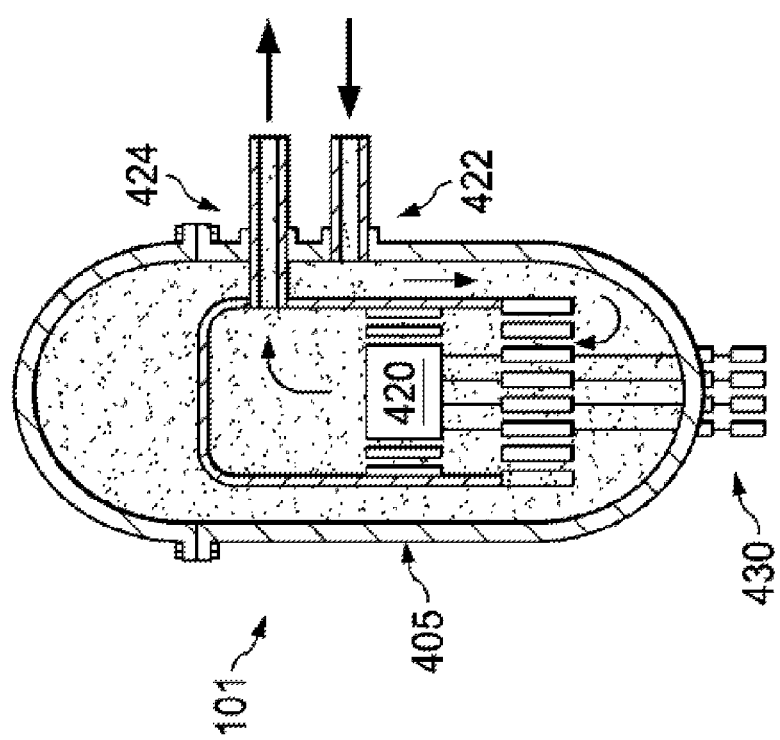
FIG. 4 illustrates an elevation view of an embodiment of an inert gas power source.

Turning now to FIG. 4, illustrated is an elevation view of an embodiment of an inert gas power source (e.g., a GFR) 101. A GFR is a fast-neutron breeder reactor operable with a Brayton closed-cycle gas turbine. A GFR employs helium as a core coolant within a containment vessel 405 capable of sustaining high pressure at high temperature. A reactor core 420 is force-convection cooled by helium as a working-fluid that is admitted at a low temperature, such as 460° F., at a low-temperature input 422 of the inert gas power source 101 and is exhausted at a high temperature such as 1650° F. at a high-temperature output 424 of the inert gas power source 101. A power level of the reactor core 420 is controlled by control rods 430. Power levels approaching a gigawatt or more are expected to be achieved in practical designs.

The reactor core 420 operates with a fast-neutron spectrum for efficient utilization of uranium and other fissile fuel sources such as thorium that can produce a high gas temperature (e.g., 2000° F. or higher) at the high-temperature output 424. Helium is a preferred coolant because it has a low neutron capture cross-section and does not produce an explosive gas such as hydrogen, which can be produced by dissociation of steam at a high temperature in a water-cooled reactor. Helium has other advantages as a coolant in that it does not condense into droplets at lower temperatures in a turbine, which can erode the surface of turbine blades, and does not produce radioactive isotopes in a nuclear environment. A GFR has attractive fuel-breeding properties, and is operable for many years without a need to recharge the fuel.

A new era for standardizing power plant unit production is thus enabled by utilization of a thermal/electrical power converter powered by an inert gas reactor such as a GFR or a VHTR to power a new or existing thermally driven process load. Economically affordable cost to build or renew a power plant by adopting multiple, standardized, high-efficiency modifications adds further advantage.

Figure 5:
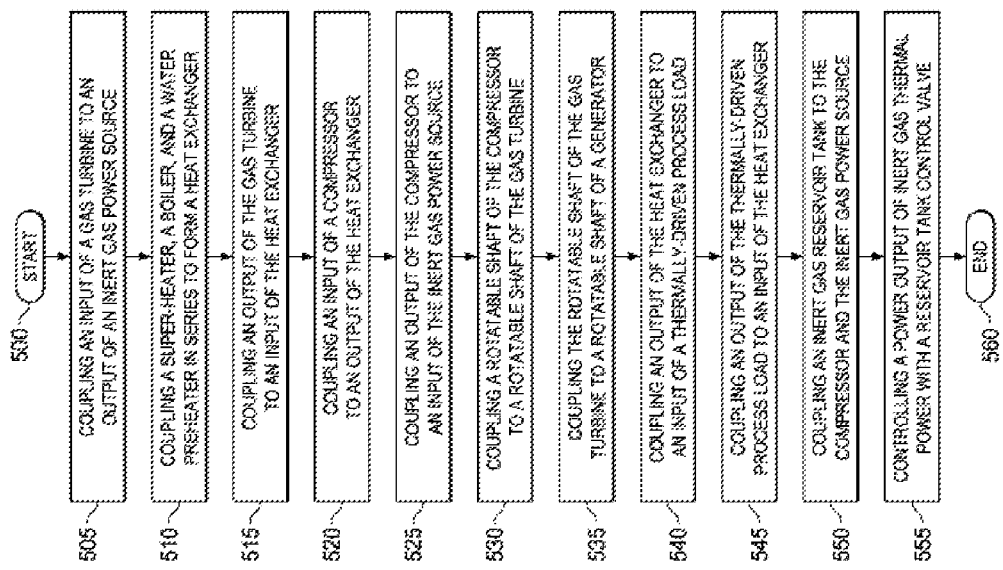
FIG. 5 illustrates a flow diagram of an embodiment of a method for providing power for a thermally-driven process load.

Turning now to FIG. 5, illustrated is a flow diagram of an embodiment of a method for providing power for a thermally-driven process load. The method begins in a start step or module 500. In a step or module 505, an input of a gas turbine is coupled to a high-temperature output of an inert gas power source. In a step or module 510, a super-heater heat exchanger, a boiler heat exchanger, and a water pre-heater heat exchanger are coupled in series to form a heat exchanger. In a step or module 515, a low-pressure output of the gas turbine is coupled to a high-temperature input of the heat exchanger. In a step or module 520, a low-pressure input of a compressor is coupled to a low-pressure output of the heat exchanger. In a step or module 525, a high-pressure output of the compressor is coupled to a low-temperature input of an inert gas power source. In a step or module 530, a rotatable shaft of the compressor is mechanically coupled to a rotatable shaft of the gas turbine. In a step or module 535, the rotatable shaft of the gas turbine is mechanically coupled to a rotatable shaft of a generator. In a step or module 540, a high-temperature steam output of the heat exchanger is coupled to a high-temperature input of the thermally-driven process load. In a step or module 545, a low-temperature output of the thermally-driven process load is coupled to a low-temperature, liquid-water input of the heat exchanger. In a step or module 550, a reservoir tank (an inert gas reservoir tank such as a helium gas tank) is coupled to a low-pressure input of the compressor via a first reservoir tank control valve and the high-pressure output of the compressor via a second reservoir tank control valve. The reservoir tank is also coupled to the low-temperature input of the inert gas power source via a return line between the compressor and the inert gas power source. In a step or module 555, a power output and/or optionally a gas temperature of inert gas thermal power is controlled with the first and second reservoir tank control valves. In a step or module 560, the method ends.

Although the high-efficiency modifications as discussed herein have been oriented to a greatly needed, clean overhaul of a depleted, coal fired power plant, the high-efficiency modifications are equally applicable to substantially eliminate the hazards of today's nuclear power plants. This could be accomplished within the context of a modification of the steam supply to the existing nuclear power plant steam turbine generation plant. The water-cooled reactor would be shut down. The high-efficiency modifications to provide a steam generator would be connected to the steam supply piping coupled to the steam turbine. For turbine steam supply flow rate and temperature matching, multiple standard high efficiency inert gas modification units could be manifolded. This process would be performed following purge of all radioactive water from the generating system including the condenser water. Through the purging, the remnant hazards of radioactive water are permanently eliminated.

The prior conventional nuclear power plant would then become safe from melt-down, explosions, and release of radioactive gases, liquids and particles. The original turbine/generator, physical, thermal, and electrical infrastructure may again be retained in service, with an increase in electrical generating capacity, and with no increase in cooling water supply.

Many of the major components of a previously functioning coal or fossil-fuel powered steam power plant including grid connection can be re-used, except the steam generation sub-system, which includes the previously used fuel supply and handling, firebox, boiler, and combustion gas exhaust chimney stacks. A water-cooled nuclear fission reactor could be similarly replaced.

A number of design variables influence compound plant performance. As a non-limiting example, the following assumptions are made, and computed performance results are shown in Table I below for a rescued steam plant design:

TABLE I

| An Example Compound System | |
|---|---|
| thermal generating capacity of new inert gas reactor | 1100 MWth |
| original plant electrical capacity | 300 MWe output from 1500 psi/900° F. input |
| added plant electrical capacity | 230 MWe |
| total electrical capacity of modified plant | 530 MWe |
| thermal discharge of nuclear reactor to environment | negligible |
| reactor inert gas input pressure | 500 psia |
| reactor inert gas output pressure | 475 psia |
| core reactor He output temperature | 900° C. (1650° F.) |
| gas turbine He output temperature | 515° C. (960° F.) |
| He compressor efficiency | 86% |
| He gas turbine efficiency | 88% |
| pressure drop ratio in each of three heat exchangers | $\partial P/P = .04$ |

TABLE I-continued

| An Example Compound System | |
|---|---|
| pressure drop ratio in core reactor | $\partial P/P = .05$ |
| compressor pressure ratio | 3.2:1 |
| gas turbine pressure ratio | 2.7:1 |
| He-to-steam mass ratio in heat exchanger arrangement | 1.28 lb He/lb steam |
| overall efficiency of modified, combined plant | 47% |

As indicated above, the resulting capacity of the modified plant is about 1.75 times the previously existing capacity with no increased thermal load on the environment.

In an embodiment, the compressor 114, the gas turbine 112, and the generator 110 can be set to operate at a variable speed of rotation. This enables variation and control of the output temperature of the gas turbine gas flow to the high-temperature input 129 to the heat exchanger 140.

A unique characteristic of the modifications introduced herein is flexibility to change the helium cycle power output at constant temperature by changing the helium pressure level within operating limits. This can maintain thermal efficiency of the gas turbine generator at different power levels. Additionally, this characteristic could be used to maintain steam temperature at a varying water/steam flow rate, or to vary the steam temperature at the same steam flow rate. Within GFR/VHTR operating pressure and flow limits, plant modifications coupled with its variable operating characteristic enable application of a given physical sized high-efficiency power and steam producing unit to be thermodynamically sized to match a range of steam turbine power plant sizes. By steam output and return pressurized water pipe manifolding of one or more high efficiency modified gas turbine/steam producing units, a broad range of steam turbine plant sizes can be accommodated.

Thus, a power generation system has been introduced herein. In one embodiment, the power generation system includes an inert gas thermal power source, a thermal/electrical power converter and a thermally-driven process load. The thermal/electrical power converter includes a closed-cycle gas turbine engine having a gas turbine with an inert gas input couplable to an inert gas output of the inert gas thermal power source, a compressor, mechanically coupled to the gas turbine, including an inert gas output couplable to an inert gas input of the inert gas thermal power source, and a generator mechanically coupled to the gas turbine. The thermal/electrical power converter also includes a heat exchanger with an input coupled to an inert gas output of the gas turbine and an inert gas output coupled to an input of the compressor. The heat exchanger includes a series-coupled super-heater heat exchanger, a boiler heat exchanger and a water preheater heat exchanger. The thermal/electrical power converter also includes an inert gas reservoir tank coupled to the inert gas input of the compressor via a reservoir tank control valve and to an inert gas output of the compressor via another reservoir tank control valve. The reservoir tank control valve and the another reservoir tank control valve are configured to regulate a power output of the thermal/electrical power converter. The thermally-driven process load includes an input coupled to another output of the heat exchanger and an output coupled to another input of the heat exchanger. The thermally-driven process load is powered by the thermal/electrical power converter, which in turn is powered by the inert gas thermal power source. In an embodiment, the thermally-driven process load is wholly powered by the thermal/electrical power converter, which in turn is wholly powered by the inert gas thermal power source.

Electrical power generation systems may be constrained by an underlying inefficiency of Carnot-cycle thermal engines (as universally used in electrical power plants), which depends on a temperature difference between a hot source that supplies energy to the plant and a cold-side thermal sink or cold sink that absorbs remaining energy. The higher the input temperature, the greater the possible power conversion efficiency for a fixed cold-side temperature provided by, for example, a lake or a stream. As a result of this observation, additional energy can be obtained from a heat source embodied in a nuclear reactor beyond that obtained by a cooler fossil fuel burning power plant by utilizing a higher temperature of a nuclear reactor core, such as 1600° F. or more, as a heat source for a first stage. The cold-side output of the first stage, which might be 900° F., is then used as the thermal input for a conventional power plant. The conventional power plant effectively becomes the heat sink for the first stage.

The operating temperature of the nuclear reactor core can be substantially higher than that produced by a fossil fuel burning power plant by using an inert gas coolant such as helium to extract thermal energy from the reactor core. The inert gas coolants typically do not chemically attack the blades of a turbine that converts the thermal energy produced by the reactor core to a mechanical output. The net result of using a reactor core as a thermal source cooled by an inert gas is a substantial improvement in plant energy efficiency that enables additional useful electrical energy to be produced without increasing the energy dumped into a lake or stream that acts as the cold-side thermal sink. The fossil fuel burning power plant may be eliminated. The lake or stream or other thermal sink is still used to absorb heat from a second stage, but no additional thermal load is presented to the lake or stream while producing a higher level of electrical power output.

The Carnot efficiency, which presents a maximum theoretical plant efficiency, can be computed using the expression $1-(T_c/T_h)$ where $T_c$ is the temperature of the cold sink and $T_h$ is the temperature of the hot source, both measured relative to absolute zero temperature (e.g., in degrees Kelvin or Rankin, not Celsius or Fahrenheit). As the temperature of the hot source becomes very high, the Carnot efficiency approaches unity. Of course, the attainable efficiency in practice is less than that computed by the Carnot expression due to practical equipment design limitations.

Taking advantage of a large temperature difference between a nuclear reactor core and a thermal sink such as a lake or stream, as introduced herein, a power generation system is formed with a thermal/electrical power converter that employs helium as a coolant for a nuclear reactor core. Helium, unlike other reactor coolants such as water, liquid sodium, air, or other inert gases such as argon, doesn't exhibit radioactivity upon exposure to radiation produced in the reactor core. No radioactive byproducts are produced by helium itself, unlike water and other possible reactor coolants. The nuclear reactor core still produces its own spent radioactive fuel, but the absence of radioactive products that are produced when using helium as a coolant provides significant design and operational advantages. In addition, helium is entirely chemically unreactive with turbine blades, even at quite high temperatures such as 1600° F. Using steam as a working fluid limits turbine input temperatures to about 900° F.

Due to its very low atomic weight and its monoatomic gas structure, helium may employ a multi-stage mechanical design for the turbine and compressor versus a cooling system that employs a higher molecular weight gas such as steam, carbon dioxide, or air. For example, a turbine operating with helium and operating with a 3:1 pressure ratio between its input and output may employ about 20-stage compressor and turbine designs. A 20-stage turbine operating with argon and rotating at a same rotational rate could operate with about a 40:1 pressure ratio.

As introduced herein, substantial redesign of conventional turbines and compressors can be avoided by using, without limitation, argon or a mixture of argon and helium as the working fluid in the turbine and compressor. Helium has a molecular weight of about four. Argon has a higher molecular weight of about 40 versus about 18 for steam and 29 for air, thereby facilitating the turbine and compressor design. Steam (water) and air, however, produce radioactive byproducts upon exposure to radiation in the nuclear reactor core and, as mentioned above, chemically react with the turbine blades at high temperatures. It is contemplated that nitrogen as an inert gas can be substituted for the argon.

Thus, a disadvantage of using argon as a coolant/working fluid in the nuclear reactor core is its production of radioactive byproducts upon exposure to radiation in the reactor core. Helium is a desirable reactor coolant because it does not become radioactive upon exposure to a nuclear core and has excellent heat-transfer properties. Argon is desirable because of its higher atomic weight and associated advantages related to design of turbines and compressors. Neither helium nor argon, being noble gases, is chemically reactive at high temperatures with the turbine blades.

Thus, a thermal/electrical power system is formed with a nuclear reactor core cooled with helium as a working fluid. Thermal energy is extracted from the helium heated in the reactor core employing a counterflow heat exchanger positioned external to the reactor core and acting as a thermal source for an electrical power system. The counterflow heat exchanger employs argon or a mixture of argon and helium as the working fluid on its output side to simplify the design of the compressor and the turbine. As a result, helium cools the reactor core while not producing radioactive byproducts and argon, or mixture (which can produce radioactive byproducts) is not exposed to radiation in the core of the reactor. In an embodiment, the counterflow heat exchanger employs a mixture of helium and argon as the working fluid on its output side. A mixture of helium and another inert gas such as nitrogen can also be used.

The counterflow heat exchanger extracts heat from the helium heated in the nuclear reactor core and provides the extracted heat to argon or other inert gas, or to an inert gas mixture. Argon or, alternatively, a mixture of helium and argon (or other higher molecular weight inert gas) does not degrade the turbine blades at high temperatures and admits the use of a turbine that can operate at temperatures higher than those used in conventional steam-driven power plants. Thus, the thermal input to a thermal/electrical power plant is also the heat sink for the first stage of the combined process. The input to the thermal/electrical power plant becomes both a heat sink for the first stage and a heat source for the second stage.

The thermal/electrical power plant is reused with little modification and power derating as the second stage, and radioactive byproducts are avoided by using helium to cool the nuclear reactor core in the first stage. The first stage produces power that can be added to that produced by the second stage that is already installed. The combined system produces about 40 percent more electrical power than the original conventional power plant with no added thermal burden on a nearby lake or stream, and no discharge of carbon dioxide and other contaminants to the atmosphere.

Figure 6:
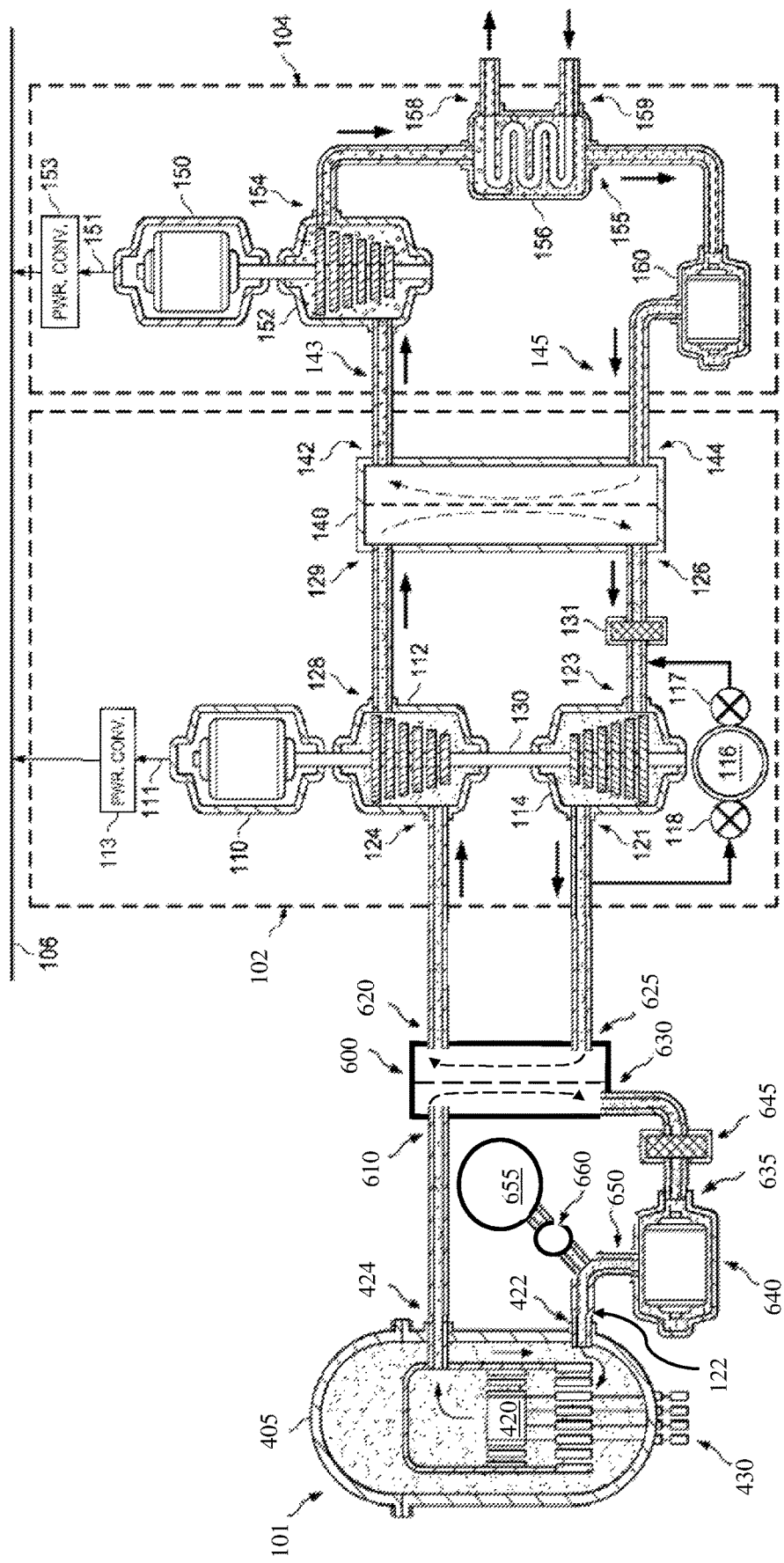
FIGS. 6 and 7 illustrate diagrams of embodiments of power generation systems.

Turning now to FIG. 6, illustrated is a diagram of an embodiment of a power generation system. The power generation system includes two, interdependent, closed-loop thermal/electrical power systems with a first stage Brayton closed-loop power generation and processing system, and a second stage Rankine closed-loop power processing system. The elements illustrated in FIG. 6 are not drawn to scale. Analogous to the power generation system of FIG. 1, the first stage is the thermal/electrical power converter 102 and the second stage is the power plant 104. The thermal/electrical power converter 102 is powered by the inert gas power source 101 (e.g., see FIGS. 1 and 4) via a counterflow heat exchanger 600. Again, other power sources such as a source of combusted fossil fuel (see, e.g., U.S. Pat. No. 5,431,016, previously incorporated by reference) can used for the inert gas power source 101 within the power generation system.

A high-temperature output 424 of the inert gas power source 101 is coupled to a thermal input 610 of the counterflow heat exchanger 600. A thermal output 620 of the counterflow heat exchanger 600 is coupled to the input 124 of the gas turbine 112 of the thermal/electrical power converter 102. On the return side, the high-pressure output 121 of the compressor 114 of the thermal/electrical power converter 102 is coupled to an input 625 of the counterflow heat exchanger 600. A low-temperature output 630 of the counterflow heat exchanger 600 is coupled to a low-pressure input 635 of a circulating pump 640 via a filter 645. A high-pressure output 650 of the circulating pump 640 is coupled to a low-temperature input 422 of the inert gas power source 101 via a return line 122.

The inert gas power source 101 such as a VHTR or a GFR can introduce dust particles into the inert gas flow, particularly with a pebble-bed reactor. Over time, dust particles can erode gas turbine and compressor blades, and even inert gas piping at piping bends. To remove such dust particles from the inert gas flow, the filter 645 can be installed between the low-temperature output 630 of the counterflow heat exchanger 600 and the low-pressure input 635 of the circulating pump 640, which is a low temperature position to install such a filter 645. In an embodiment, such a filter 645 can have a minimum equivalent reporting value ("MERV") of seven.

A reservoir tank 655 is coupled to the return line 122 via a valving and pumping apparatus 660. The valving and pumping apparatus 660 is employed to maintain a pressure of an inert gas such as helium inside the inert gas power source 101 to regulate a temperature (such as 1600° F.) and/or a pressure (such as a few dozen atmospheres or more) at the high-temperature output 424 of the inert gas power source 101 in view of a fluctuating electrical load on the two-stage power generation system.

The thermal/electrical power converter 102 is assumed herein to be operable between its input and a combined output that includes the electrical power output 111 of the generator 110 and a thermal output between a high-temperature steam output 142 and a low-temperature, liquid-water input 144 of the heat exchanger 140 with highly efficient power conversion. This assumes that the generator 110 is operable with substantially 100 percent power conversion efficiency. A practical generator operable to convert mechanical shaft power to an electrical output in a power plant can generally achieve a power conversion efficiency in the mid- to high-90 percent range, and the slightly imperfect power conversion efficiency of such a high-power generator is ignored herein. Such mechanical-to-electrical power conversion plants are not limited by a second-law efficiency constraint imposed by a Carnot cycle. It is contemplated that heat produced in the generator 110 by its imperfect power conversion efficiency can be recaptured in the cold-side thermal loop, for instance, before the filter 131.

The high-temperature steam output 142 of the heat exchanger 140 is coupled to an input 143 of the power plant 104. In an embodiment, the thermal energy produced at the high-temperature steam output 142 of the heat exchanger 140 provides the power input to the power plant 104, which can be an existing, modified steam-driven plant. A high-pressure, cooled-water output 145 of the power plant 104 is coupled to the low-temperature, liquid-water input 144 of the heat exchanger 140. Thus, substantially the entire thermal output of thermal/electrical power converter 102 is supplied to the power plant 104, with possible exception of the small inefficiency of the generator 110 and modest inefficiency of the counterflow heat exchanger 600. No substantial thermal sink need be coupled to the thermal/electrical power converter 102 with exception of modest cooling for the generator 110. In an embodiment, thermal energy obtained from cooling the generator 110 is recovered at the heat exchanger 140.

Pipeline pressure losses are included in calculating heat exchanger pressure drops for convenience in calculating system performance evaluations. A small pressure drop at the input side of the heat exchanger 140 does not contribute to system inefficiency. The small pressure drop of the heat exchanger 140 is simply accommodated by operating pressure differences between the compressor 114 and the gas turbine 112. Thermal content of heated water or other heated fluid that may be employed to cool the generator 110 (or other system elements) may be employed to preheat the low pressure, cooled inert gas at the high-temperature steam output 142 of the heat exchanger 140 before being supplied to the compressor 114 to provide a further efficiency enhancement to the thermal/electrical power converter 102. The power plant 104 is operable as described previously hereinabove with reference to FIG. 1. The overall power-conversion efficiency of the power generation system illustrated in FIG. 6 is similar to that described hereinabove with reference to FIG. 1 and won't be repeated in the interest of brevity.

Figure 7:
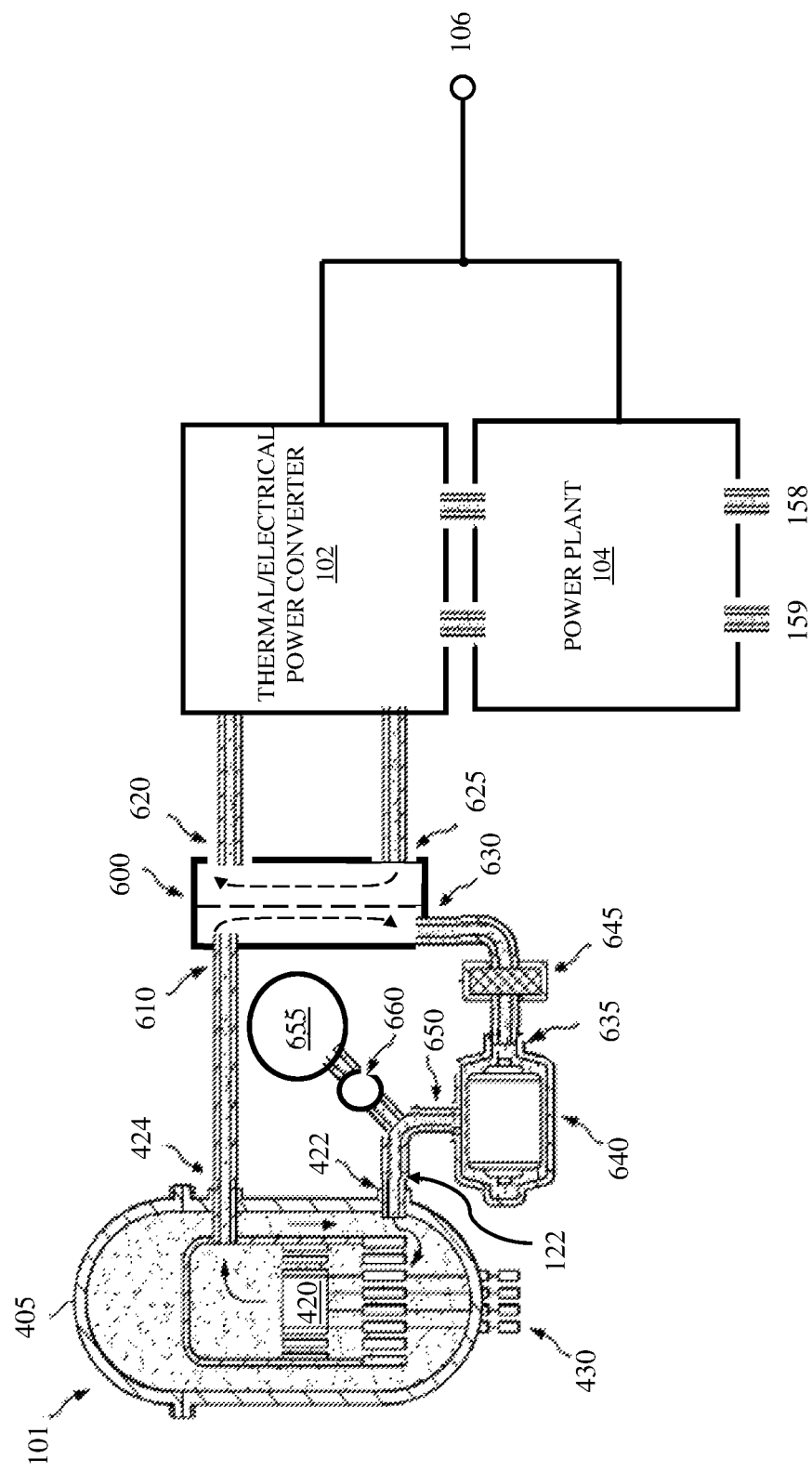

Turning now to FIG. 7, illustrated is a diagram of an embodiment of a power generation system. The power generation system of FIG. 7 is analogous to the power generation system of FIG. 6, but more clearly demonstrates the relationships between the stages thereof. As illustrated, an output of the thermal/electrical power converter 102 (the first stage) is thermally coupled in series to a thermal input of the power plant 104. The high-temperature water output 158 of the power plant 104 is thermally coupled to a cold sink such as a lake or a stream. Electrical power outputs of the thermal/electrical power converter 102 and the power plant 104 are electrically coupled in parallel as demonstrated by the connection to the power grid 106. The remaining items illustrated in FIG. 7 have been described previously hereinabove and will not be redescribed in the interest of brevity.

Thus, as introduced herein, a counterflow heat exchanger is inserted between an inert gas power source employing an inert gas such as helium and a cascaded arrangement of a thermal/electrical power converter and a power plant. By positioning the counterflow heat exchanger between the helium-cooled inert gas power source and the cascaded arrangement of the thermal/electrical power converter and the power plant, beneficial thermal and radioactive aspects of the power generation system are realized. Helium is a desirable coolant for the inert gas power source because it does not become radioactive upon exposure to a nuclear core and has excellent heat-transfer properties. Employing a second inert gas such as argon, an inert gas mixture such as argon and helium, or air (or mixture of air and an inert gas) with a higher molecular weight in the first stage of the cascaded arrangement (the thermal/electrical power converter) simplifies design of a compressor and turbine. The architecture further allows a reservoir tank arrangement containing the inert gas mixture and coupled to two control valves to control the temperature and pressure of the inert gas mixture that is discharged from a turbine in the first stage of the cascade arrangement of thermal/electrical power converter coupled to a generator. The result enables the temperature of a working fluid fed to the second stage (a power plant) to be controlled.

Figure 8:
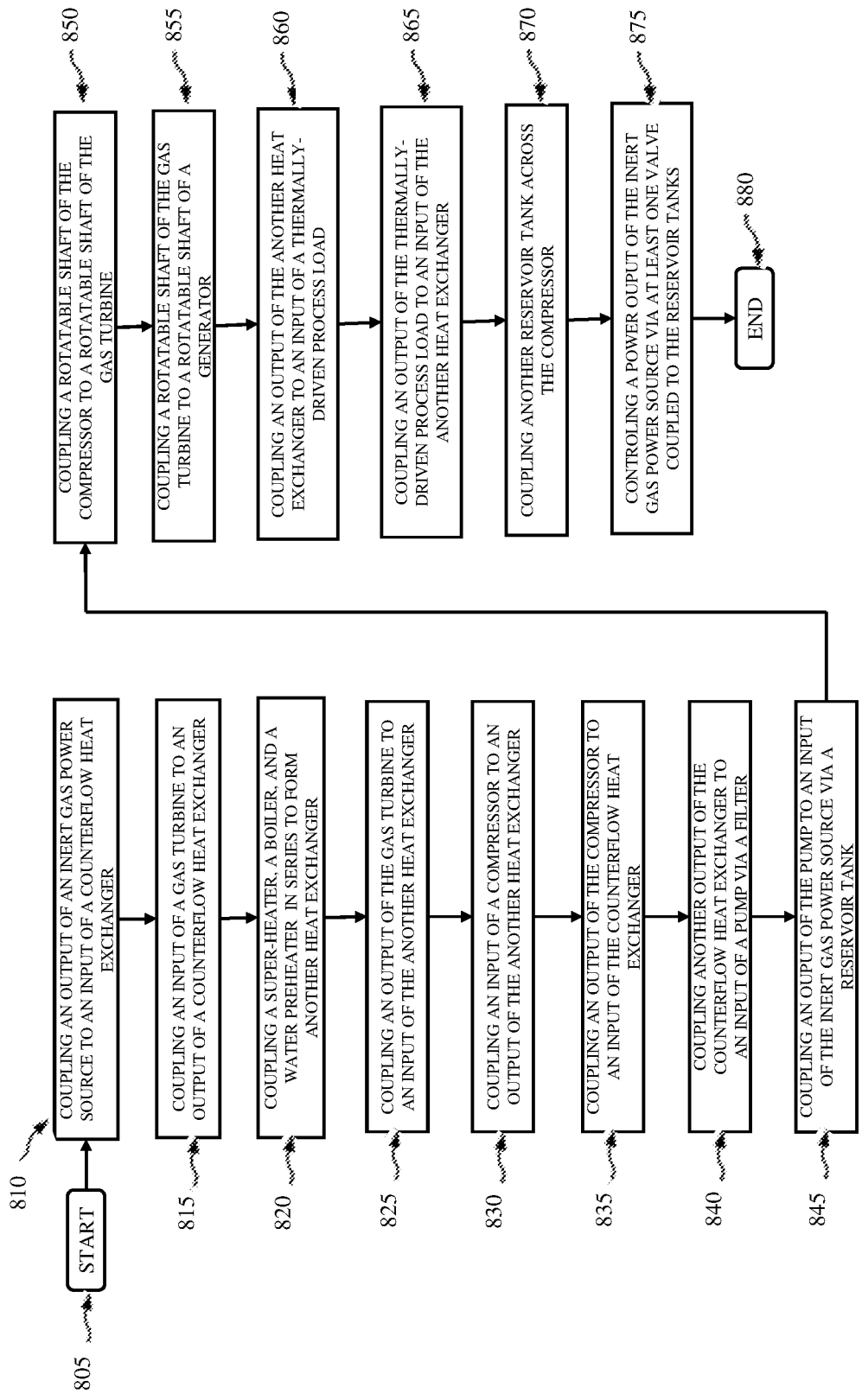
FIG. 8 illustrates a flow diagram of an embodiment of a method for constructing a thermal/electrical power system.

Turning now to FIG. 8, illustrated is a flow diagram of an embodiment of a method for providing power for a thermally-driven process load. The method begins in a start step or module 805. In a step or module 810, a high-temperature output of the inert gas power source employing a first inert gas such as helium is coupled to a thermal input of the counterflow heat exchanger. The counterflow heat exchanger is configured to transfer thermal energy from the inert gas power source to a first stage of the power generation system. In a step or module 815, an input of a gas turbine of the first stage of the power generation system is coupled to a thermal output of the counterflow heat exchanger. The first stage of the power generation system conducts a second inert gas such as argon, air or a mixture. In a step or module 820, a super-heater heat exchanger, a boiler heat exchanger, and a water preheater heat exchanger are coupled in series to form another heat exchanger. In a step or module 825, a low-pressure output of the gas turbine is coupled to a high-temperature input of the another heat exchanger. In a step or module 830, a low-pressure input of a compressor is coupled to a low-pressure output of the another heat exchanger.

In a step or module 835, a high-pressure output of the compressor is coupled to an input of the counterflow heat exchanger. In a step or module 840, another output of the counterflow heat exchanger is coupled to a low-pressure input of a circulating pump via a filter. In a step or module 845, a high-pressure output of the circulating pump is coupled to a low-temperature input of the inert gas power source via a valving and pumping apparatus and a reservoir tank (an inert gas reservoir tank such as a helium gas tank). The circulating pump enables an inert gas such as helium to circulate between the inert gas power source and the counterflow exchanger. The reservoir tank coupled to the inert gas power source by the valving and pumping apparatus is configured to regulate a temperature and/or pressure at the output of the inert gas power source.

In a step or module 850, a rotatable shaft of the compressor is mechanically coupled to a rotatable shaft of the gas turbine. In a step or module 855, the rotatable shaft of the gas turbine is mechanically coupled to a rotatable shaft of a generator. In a step or module 860, a high-temperature steam output of the another heat exchanger is coupled to a high-temperature input of the thermally-driven process load. In a step or module 865, a low-temperature output of the thermally-driven process load is coupled to a low-temperature, liquid-water input of the another heat exchanger. In a step or module 870, another reservoir tank (an inert gas reservoir tank such as an argon or mixture gas tank) is coupled across the compressor via a first reservoir tank control valve and a second reservoir tank control valve. In a step or module 875, a power output and/or optionally a gas temperature of the inert gas power source is controlled with at least one valve coupled to the reservoir tanks. In a step or module 880, the method ends.

A power generation system and related method of forming and operating the same has been introduced herein. In one embodiment, the power generation system includes an inert gas power source (101) having an input (422, 122) and an output (424), and a thermal/electrical power converter (102) including a compressor (114) with an output (121) coupled to the input (422, 122) of the inert gas power source (101). The power generation system also includes a power plant (104) with an input (143) coupled in series with an output (142) of the thermal/electrical power converter (102), wherein the thermal/electrical power converter (102) and the power plant (104) are configured to serially convert thermal power produced at the output (424) of the inert gas power source (101) into electricity.

The power generation system may also include an inert gas reservoir tank (116) coupled to an input (123) of the compressor (114) via a reservoir tank control valve (117) and to the output (121) of the compressor (114) via another reservoir tank control valve (118). The reservoir tank control valve (117) and the another reservoir tank control valve (118) are configured to regulate a temperature and/or pressure of the output (142) of the thermal/electrical power converter (102). The power generation system may also include a heat exchanger (140) having an input (129) coupled to an output (128) of a gas turbine, an output (126) coupled to the input (123) of the compressor (114), and the output (142) coupled to the power plant (104). The thermal/electrical power converter (102) and the power plant (104) are thermally coupled in series and electrically coupled in parallel.

The power generation system may also include a counterflow heat exchanger (600) with an input (610) coupled to the output (424) of the inert gas power source (101), and an output (620) coupled to an input (124) of a gas turbine (112) of the thermal/electrical power converter (102). The inert gas power source (101) provides a first inert gas (e.g., helium) to the input (610) of the counterflow heat exchanger (600) to transfer thermal energy to a second inert gas (e.g., argon or a mixture of argon and helium) or air (or a mixture of air and an inert gas) at the output (620) of the counterflow heat exchanger (600). The second inert gas may have an average molecular weight equal to or greater than an average molecular weight of air.

The power generation system may also include a circulating pump (640) configured to circulate the first inert gas between the inert gas power source (101) and the counterflow heat exchanger (600). A filter (645) of the power generation system is coupled between another output (630) of the counterflow heat exchanger (600) and an input (635) of the circulating pump (640). The power generation system may also include another inert gas reservoir tank (655) coupled to the inert gas power source (101) by a valving and pumping apparatus (660) configured to regulate a temperature and/or pressure at the output (424) of the inert gas power source (101).

As described above, the exemplary embodiment provides both a method and corresponding systems consisting of various modules providing functionality for performing the steps of the method. The modules may be implemented as hardware, software or combinations thereof. Although the embodiments and its advantages have been described in detail, it should be understood that various changes, substitutions, and alterations can be made herein without departing from the conceptual spirit and scope thereof as defined by the appended claims. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A power generation system, comprising:
   a power source comprising an input and an output;
   a thermal/electrical power converter including a compressor with an output coupled to said input of said power source;
   a power plant with an input coupled to an output of said thermal/electrical power converter, wherein said thermal/electrical power converter and said power plant are configured to convert thermal power produced at said output of said power source into electricity; and
   an inert gas reservoir tank coupled to an input of said compressor via a reservoir tank control valve and to said output of said compressor via another reservoir tank control valve.

2. The power generation system as recited in claim 1 further comprising a counterflow heat exchanger with an input coupled to said output of said power source, and an output coupled to an input of a gas turbine of said thermal/electrical power converter.

3. The power generation system as recited in claim 2 wherein said power source is an inert gas power source that provides a first inert gas to said input of said counterflow heat exchanger to transfer thermal energy to a second inert gas at said output of said counterflow heat exchanger.

4. The power generation system as recited in claim 3 wherein said first inert gas is helium and said second inert gas is argon or a mixture of argon and helium.

5. The power generation system as recited in claim 3 further comprising a circulating pump configured to circulate said first inert gas between said inert gas power source and said counterflow heat exchanger.

6. The power generation system as recited in claim 5 further comprising a filter coupled between another output of said counterflow heat exchanger and an input of said circulating pump.

7. The power generation system as recited in claim 3 further comprising another inert gas reservoir tank coupled to said inert gas power source.

8. The power generation system as recited in claim 1 further comprising a heat exchanger having an input coupled to an output of a gas turbine, an output coupled to said input of said compressor, and said output of said heat exchanger coupled to said power plant.

9. The power generation system as recited in claim 1 wherein said thermal/electrical power converter and said power plant are thermally coupled in series and electrically coupled in parallel.

10. The power generation system as recited in claim 1 wherein said power source comprises fossil fuel.

11. A method, comprising:
    providing a power source comprising an input and an output;
    coupling said input of said power source to an output of a compressor of a thermal/electrical power converter;
    coupling an output of said thermal/electrical power converter to an input of a power plant, wherein said thermal/electrical power converter and said power plant are configured to convert thermal power produced at said output of said power source into electricity; and
    coupling an inert gas reservoir tank to an input of said compressor via a reservoir tank control valve and to said output of said compressor via another reservoir tank control valve.

12. The method as recited in claim 11 further comprising coupling said output of said power source to an input of a counterflow heat exchanger, coupling an output of said counterflow heat exchanger to an input of a gas turbine of said thermal/electrical power converter.

13. The method as recited in claim 12 wherein said power source is an inert gas power source and further comprising providing a first inert gas to said input of said counterflow heat exchanger to transfer thermal energy to a second inert gas at said output of said counterflow heat exchanger.

14. The method as recited in claim 13 wherein said first inert gas is helium and said second inert gas is argon or a mixture of argon and helium.

15. The method as recited in claim 13 further comprising circulating said first inert gas between said inert gas power source and said counterflow heat exchanger.

16. The method as recited in claim 15 further comprising coupling another output of said counterflow heat exchanger to an input of said circulating pump via a filter.

17. The method as recited in claim 13 further comprising coupling another inert gas reservoir tank to said inert gas power source.

18. The method as recited in claim 11, further comprising:
    coupling an input of a heat exchanger to an output of a gas turbine,
    coupling an output of said heat exchanger to said input of said compressor, and
    coupling said output of said heat exchanger to said power plant.

19. The method as recited in claim 1 wherein said thermal/electrical power converter and said power plant are thermally coupled in series and electrically coupled in parallel.

20. The method as recited in claim 11 wherein said power source comprises fossil fuel.

* * * * *